US010291045B2

(12) United States Patent
Jeong et al.

(10) Patent No.: US 10,291,045 B2
(45) Date of Patent: May 14, 2019

(54) APPARATUS FOR CHARGING WEARABLE ELECTRONIC DEVICE

(71) Applicant: Samsung Electronics Co., Ltd., Gyeonggi-do (KR)

(72) Inventors: Uy Hyeon Jeong, Suwon-si (KR); Seung Ho Lee, Seoul (KR); Sang In Baek, Suwon-si (KR); Min Sung Lee, Suwon-si (KR); Hyung Geun Lee, Seoul (KR); Min Woo Yoo, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 15/610,308

(22) Filed: May 31, 2017

(65) Prior Publication Data

US 2017/0346320 A1   Nov. 30, 2017

(30) Foreign Application Priority Data

May 31, 2016 (KR) ........................ 10-2016-0067674

(51) Int. Cl.
*H02J 7/00* (2006.01)
*H02J 7/04* (2006.01)
(Continued)

(52) U.S. Cl.
CPC .......... *H02J 7/0044* (2013.01); *H01R 13/642* (2013.01); *H02J 7/0027* (2013.01);
(Continued)

(58) Field of Classification Search
USPC ................. 320/107, 108, 134, 132, 114, 101
See application file for complete search history.

(56) References Cited

U.S. PATENT DOCUMENTS

| 2014/0077763 | A1* | 3/2014 | Szymanski | ........... | H02J 7/0045 320/114 |
| 2014/0141635 | A1* | 5/2014 | Saunders | ............... | H01R 29/00 439/170 |

(Continued)

FOREIGN PATENT DOCUMENTS

| EP | 0018323 A2 | 10/1980 |
| JP | 2003331806 A | 11/2003 |

(Continued)

OTHER PUBLICATIONS

Extended European Search Report, dated Oct. 20, 2017, regarding Application No. 17173794.3, 11 pages.

*Primary Examiner* — Alexis B Pacheco

(57) ABSTRACT

An apparatus for charging a wearable electronic device includes a first power terminal and a second power terminal to which predetermined voltage values are applied, respectively and a first ground terminal and a second ground terminal. The first power terminal and the first ground terminal are arranged in a first direction with respect to a first axis. The second power terminal and the second ground terminal are arranged in a second direction opposite to the first direction with respect to the first axis. The wearable electronic device is charged through the first power terminal and the first ground terminal when the wearable electronic device is placed on the apparatus in the first direction. The wearable electronic device is charged through the second power terminal and the second ground terminal when the wearable electronic device is placed on the apparatus in the second direction.

20 Claims, 13 Drawing Sheets

(51) Int. Cl.
*H01R 13/642* (2006.01)
*G06F 1/16* (2006.01)
*H01R 13/62* (2006.01)
*H04M 1/06* (2006.01)
*G06F 1/26* (2006.01)

(52) U.S. Cl.
CPC ............ *G06F 1/163* (2013.01); *G06F 1/1632* (2013.01); *G06F 1/266* (2013.01); *H01R 13/6205* (2013.01); *H02J 7/0036* (2013.01); *H04M 1/06* (2013.01)

(56) References Cited

U.S. PATENT DOCUMENTS

| | | | | |
|---|---|---|---|---|
| 2015/0241922 A1* | 8/2015 | Farjami | ................ | G06F 1/1635 361/679.03 |
| 2016/0365190 A1* | 12/2016 | Jeong | ...................... | H01F 38/14 |
| 2018/0076648 A1* | 3/2018 | Kumar | .................... | H02J 7/025 |
| 2018/0102605 A1* | 4/2018 | Patton | .................... | G02C 5/146 |

FOREIGN PATENT DOCUMENTS

| | | |
|---|---|---|
| KR | 19980012768 U | 6/1998 |
| WO | 2009086567 A1 | 7/2009 |

* cited by examiner

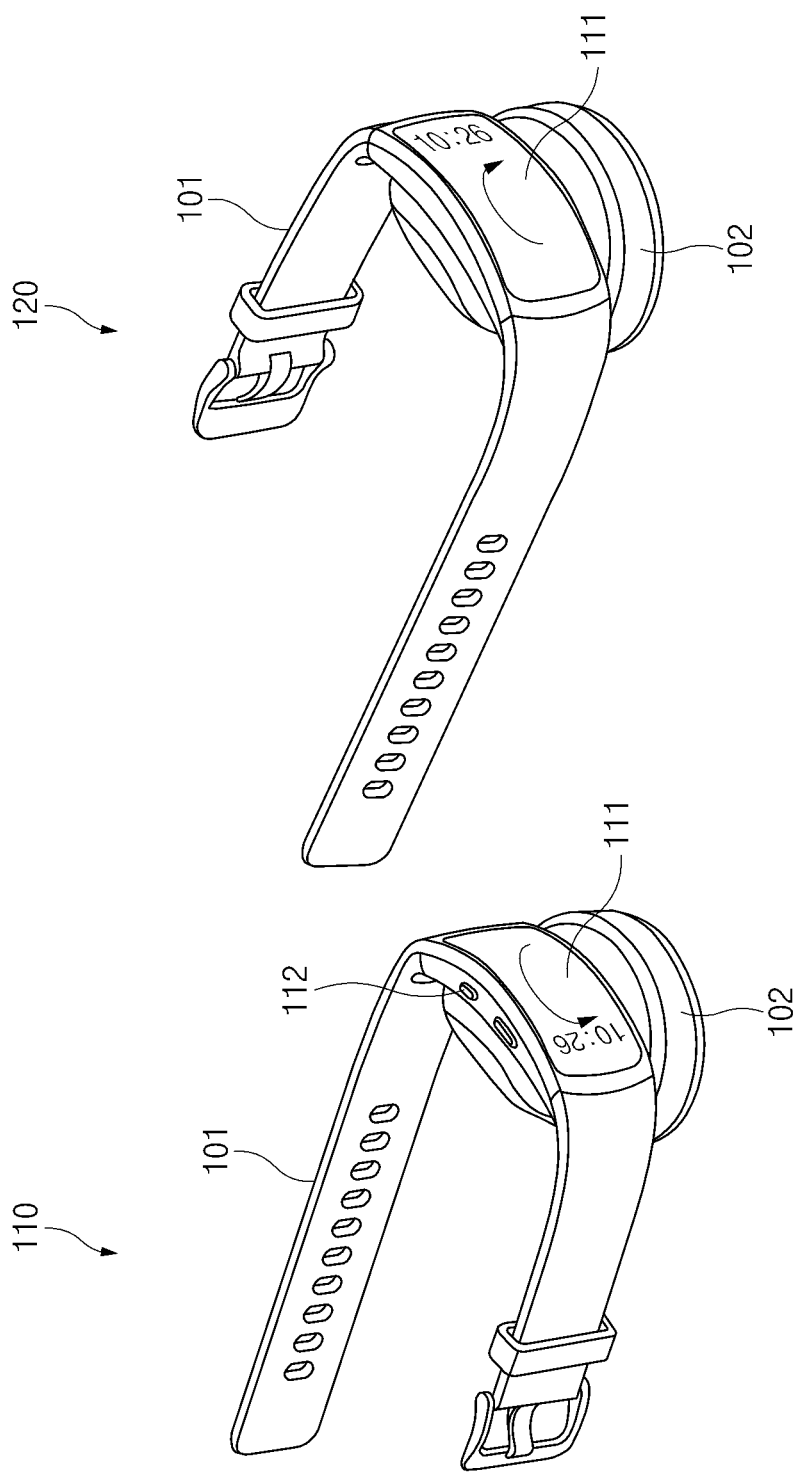

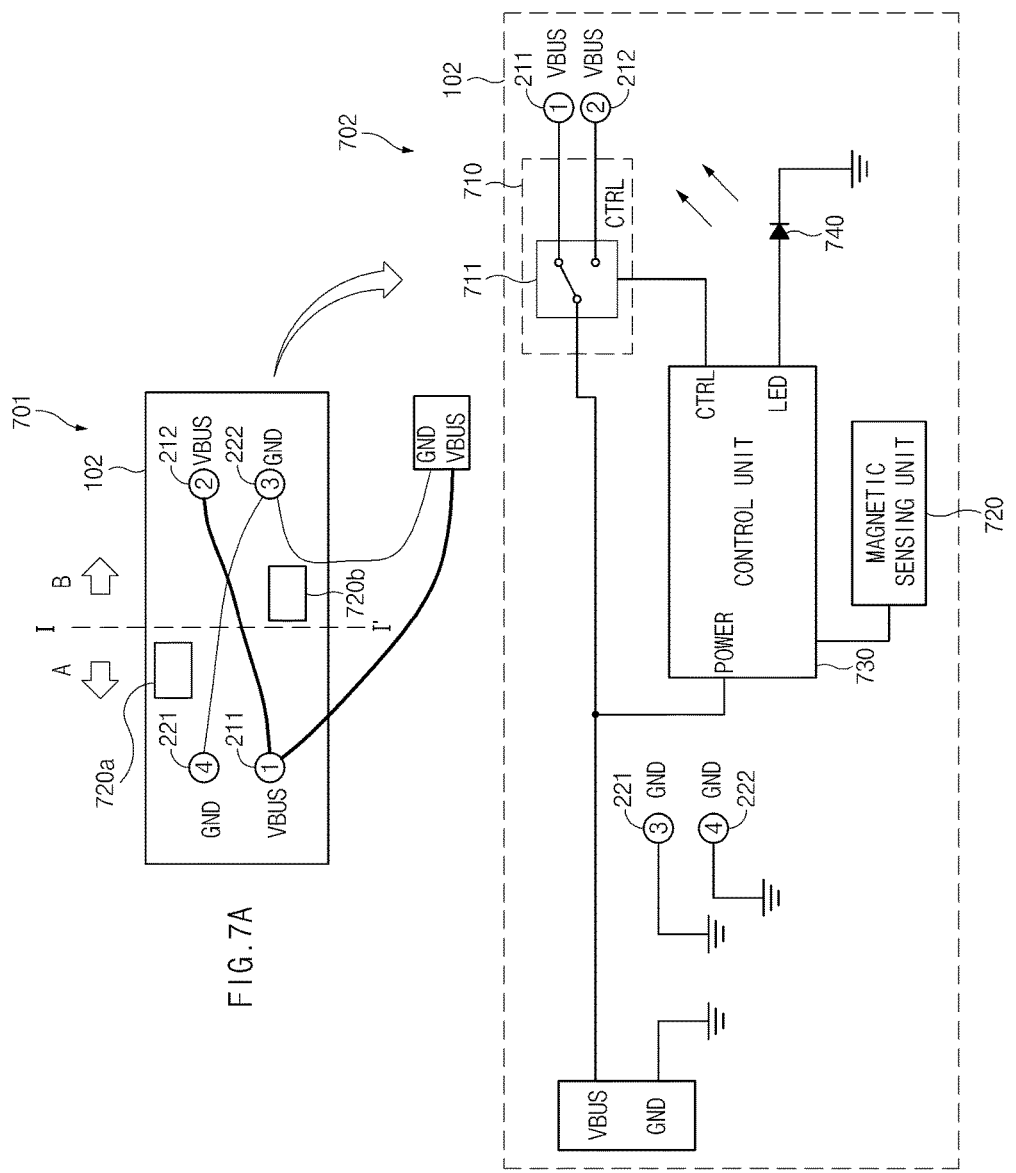

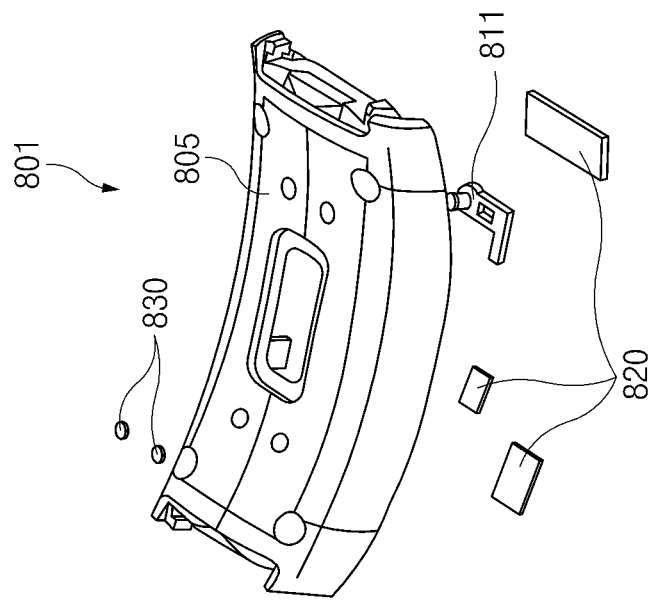
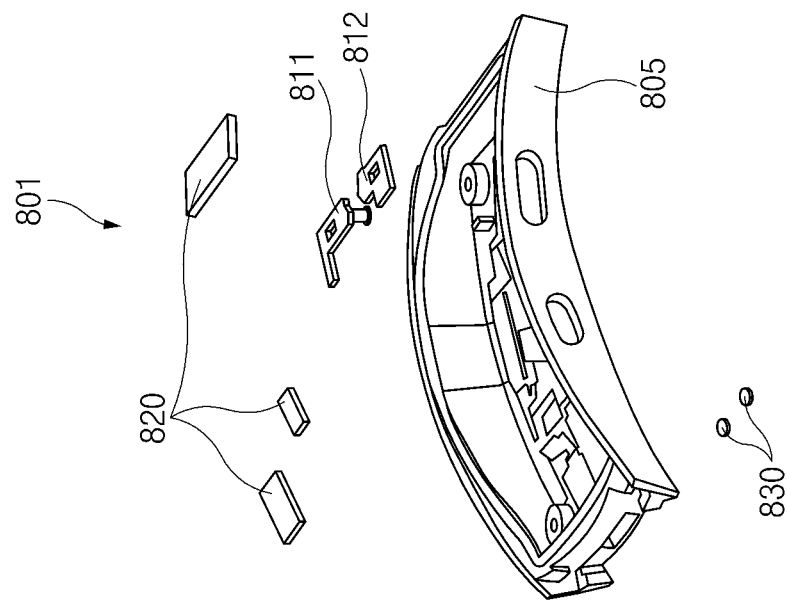

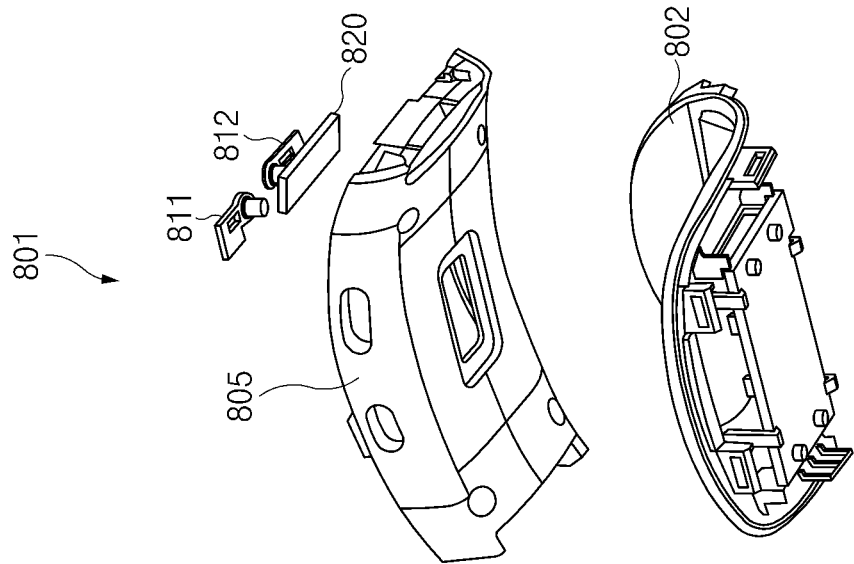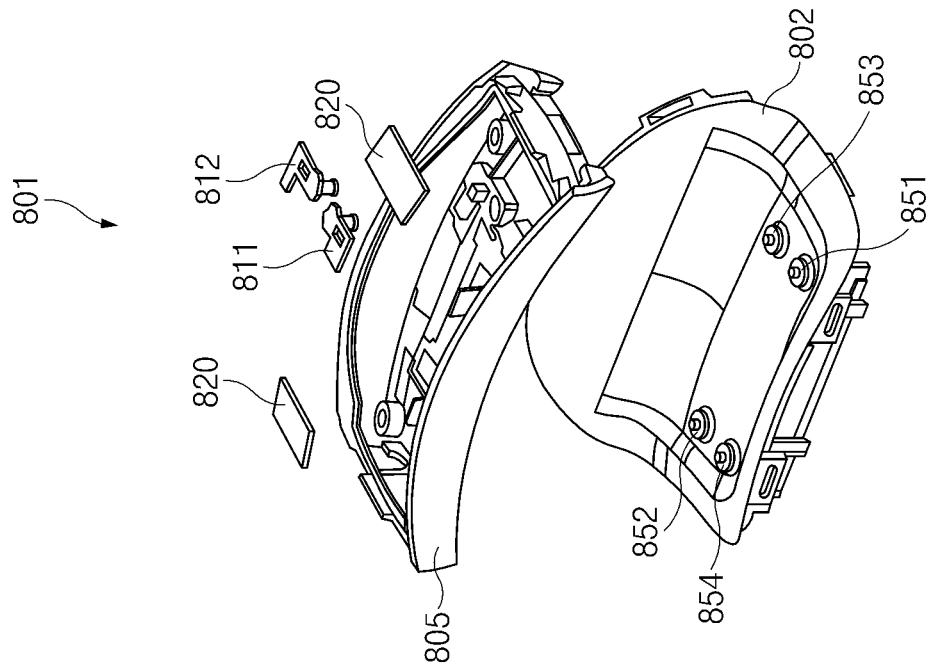

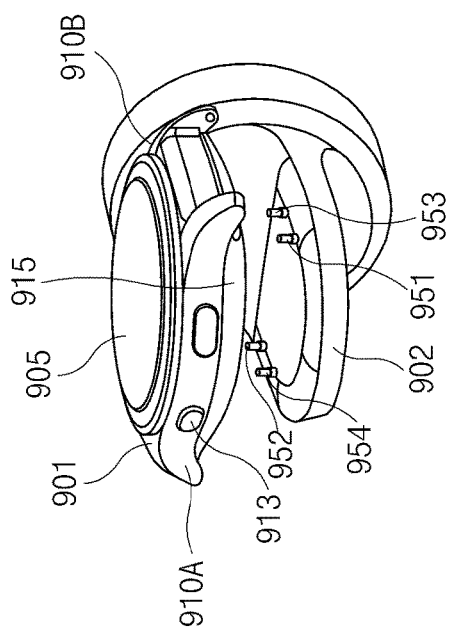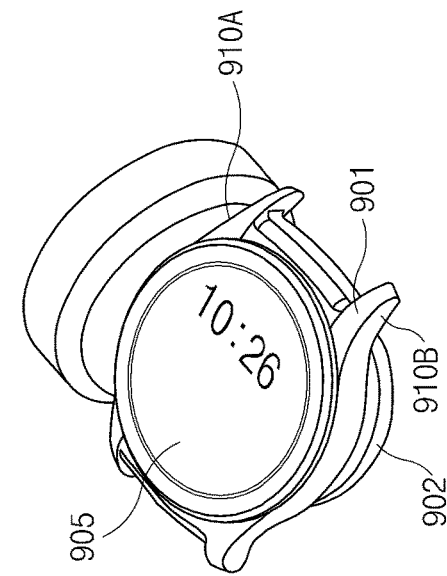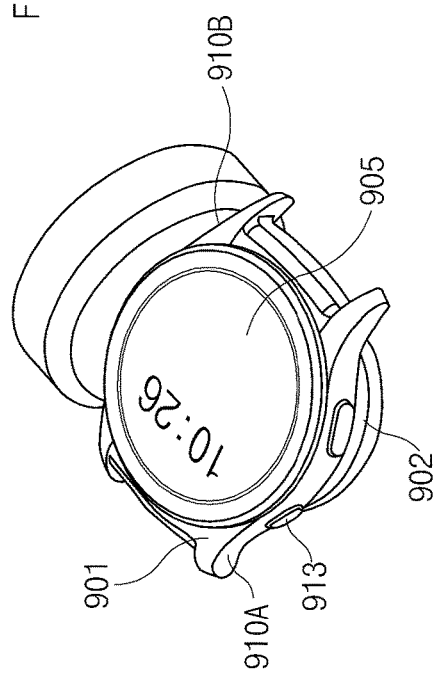
FIG. 9B
FIG. 9C
FIG. 9A

APPARATUS FOR CHARGING WEARABLE ELECTRONIC DEVICE

CROSS-REFERENCE TO RELATED APPLICATION(S) AND CLAIM OF PRIORITY

The present application is related to and claims the benefit under 35 U.S.C. § 119(a) of a Korean patent application filed on May 31, 2016 in the Korean Intellectual Property Office and assigned Serial Number 10-2016-0067674, the entire disclosure of which is hereby incorporated by reference.

TECHNICAL FIELD

The present disclosure relates to an apparatus capable of charging a wearable electronic device.

BACKGROUND

In recent years, various types of wearable electronic devices such as smart watches, smart bands, smart necklaces, and the like have been developed. The function of wearable electronic devices has gradually expanded, and wearable electronic devices may perform various functions such as phone calls, health management, clock, message confirmation, schedule confirmation, and the like.

A battery may be mounted in a wearable electronic device, which is charged through an external charging apparatus. The wearable electronic device may be charged in various schemes such as charging through a cable connection, wireless charging, charging through a contact between terminals, and the like.

SUMMARY

In a case that a wearable electronic device is charged through contact between terminals, a charging apparatus according to the related art may charge the wearable electronic device only when being coupled in a predetermined direction. In this case, there is an inconvenience that the user can confirm the coupling direction in advance to charge the wearable electronic device, and the failure of the device may occur due to erroneous coupling.

To address the above-discussed deficiencies, it is an object to provide advantages such as those described below. Accordingly, an aspect of the present invention is to provide an apparatus for charging a wearable electronic device. The apparatus includes a first power terminal and a second power terminal to which predetermined voltage values are applied, respectively, and a first ground terminal and a second ground terminal, wherein the first power terminal and the first ground terminal are arranged in a first direction with respect to a first axis, wherein the second power terminal and the second ground terminal are arranged in a second direction opposite to the first direction with respect to the first axis, wherein the wearable electronic device is charged through the first power terminal and the first ground terminal when the wearable electronic device is placed on the apparatus in the first direction, and wherein the wearable electronic device is charged through the second power terminal and the second ground terminal when the wearable electronic device is placed on the apparatus in the second direction.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A and 1B are views illustrating a wearable electronic device and a charging apparatus according to various embodiments;

FIGS. 3A-3L are views illustrating various terminal arrangements of a charging apparatus according to various embodiments;

FIGS. 7A and 7B are circuit diagrams illustrating a selective connection of a power terminals using magnetic sensing according to various embodiments;

FIGS. 8A and 8B are views illustrating an internal configuration of a wearable electronic device according to various embodiments;

FIGS. 8C and 8D are views illustrating a state that a wearable electronic device is suitably placed on a charging apparatus according to various embodiments;

FIGS. 9A-9C are views illustrating states that a wearable electronic device having a circular display is suitably placed on a charging apparatus according to various embodiments.

Throughout the drawings, it should be noted that like reference numbers are used to depict the same or similar elements, features, and structures.

DETAILED DESCRIPTION

Figure 2A:
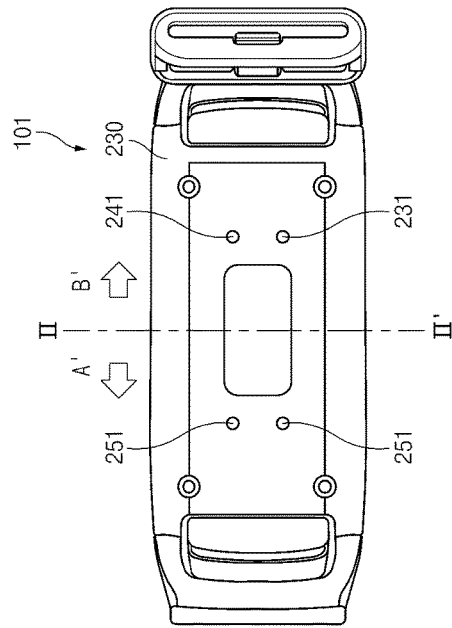
FIGS. 2A-2D are views illustrating terminal arrangements of a charging apparatus and a wearable electronic device according to various embodiments.

FIGS. 1A through 9D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" does not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIGS. 1A and 1B are views illustrating a wearable electronic device and a charging apparatus according to various embodiments.

A wearable electronic device 101 may be a device worn by a user such as a smart watch, a smart band, a smart necklace, and the like. The wearable electronic device 101 may include a display 111 for outputting content, a button part 112, and the like.

A case where the wearable electronic device 101 is a smart watch is illustratively shown, but the embodiment is not limited thereto. In addition, although a smart watch having a rectangular appearance is shown as the wearable electronic device 101, the embodiment is not limited thereto. For example, the wearable electronic device 101 may be a circular smart watch (see FIGS. 9A-9D).

The wearable electronic device 101 may include a battery therein. The battery may be charged with power supplied through a charging terminal exposed to an outside of the wearable electronic device 101.

The wearable electronic device 101 may be charged by allowing a charging terminal exposed to an outside of a housing to make contact with a charging apparatus 102. The wearable electronic device 101 may be suitably placed on the charging apparatus 102 through mechanical coupling (e.g., a hook structure) or magnetic coupling (e.g., coupling using a magnet).

According to various embodiments, the wearable electronic device 101 may be charged through one power supply terminal and one ground connection terminal. When the wearable electronic device 101 is suitably placed on the charging apparatus 102, the power supply terminal may be in contact with a power terminal of the charging apparatus 102, and the ground connection terminal may be in contact with a ground terminal of the charging apparatus 102 (See FIGS. 2A to 9B).

The charging apparatus 102 may include terminals configured to supply power to the wearable electronic device 101 on one surface thereof (hereinafter, referred to as a 'charging surface'). The terminals may include a plurality of power terminals and a plurality of ground terminals. According to various embodiments, in a case that the wearable electronic device 101 is suitably placed in a first direction (FIG. 1A), the wearable electronic device 101 may make contact with a first set of terminals (e.g., a first power terminal and a first ground terminal), so that the charging apparatus 102 may charge the wearable electronic device 101. In a case that the wearable electronic device 101 is suitably placed in a second direction opposite to the first direction (FIG. 1B), the wearable electronic device 101 may make contact with a second set of terminals (e.g., a second power terminal and a second ground terminal), so that the charging apparatus 102 may charge the wearable electronic device 101.

For example, a user may charge the wearable electronic device 101 by suitably placing the wearable electronic device 101 on the charging apparatus 102 in a state where the button part 111 of the wearable electronic device 101 is visible or invisible.

Additional information about the terminal arrangement of the wearable electronic device 101 and the charging apparatus 102 may be provided through FIG. 2.

FIGS. 2A-2D include views illustrating the terminal arrangement of the charging apparatus and the wearable electronic device according to various embodiments. These depictions are illustrative and the embodiment is not limited thereto.

A charging apparatus 210 may include a charging surface 210 on which terminals to contact the wearable electronic device 101 are mounted. The charging apparatus 210 may include a first power terminal 211, a second power terminal 212, a first ground terminal 221, and a second ground terminal 222 on the charging surface 210. According to various embodiments, each of the first power terminal 211, the second power terminal 212, the first ground terminal 221, and the second ground terminal 222 may be implemented in the form of a pogo pin that operates elastically.

The arrangement positions of the first power terminal 211, the second power terminal 212, the first ground terminal 221, and the second ground terminal 222 are illustrative and the embodiment is not limited thereto. For example, the charging apparatus 210 may be implemented in a form in which the position of the first power terminal 211 and the position of the first ground terminal 221 interchange with each other and the position of the second power terminal 212 and the position of the second ground terminal 222 interchange with each other.

Figure 2B:
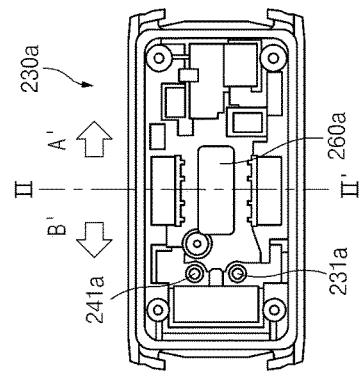

According to various embodiments, the first power terminal 211 and the first ground terminal 221 may be arranged in a first direction (e.g., direction A; FIGS. 2A and 2B) with respect to a first axis or virtual first axis I-I', and the second power terminal 212 and the second ground terminal 222 may be arranged in a second direction (e.g., direction B) opposite to the first direction (e.g., the direction A) with respect to the first axis or virtual first axis I-I'. The term "virtual", as used herein, may be characterized as: of, relating to, or being a hypothetical entity whose existence is inferred from indirect evidence.

In one embodiment, the virtual first axis I-I' may be a straight line passing through the center of the charging surface 210. In another embodiment, the virtual first axis I-I' may be a straight line passing through the midpoint of the straight line L1 connecting the first power terminal 211 and the second power terminal 212. In still another embodiment, the virtual first axis I-I' may be a straight line passing through the midpoint of a straight line L2 connecting the first ground terminal 221 and the second ground terminal 222. In still another embodiment, the virtual first axis I-I' may be a straight line passing through the intersection of the straight L1 (which is a straight line connecting the first power terminal 211 and the second power terminal 212) and the straight line L2 (which is a straight line connecting the first ground terminal 221 and the second ground terminal 222).

When the wearable electronic device 101 is suitably placed on the charging surface 210 such that the terminals (e.g., a power supply terminal 231 and a ground connection terminal 241) for charging the wearable electronic device 101 is arranged in the first direction (e.g., direction A), the wearable electronic device 101 may be charged through the first power terminal 211 and the first ground terminal 221. To the contrary, when the wearable electronic device 101 is suitably placed on the charging surface 210 such that the terminals (e.g., the power supply terminal 231 and the ground connection terminal 241) for charging the wearable electronic device 101 is arranged in the second direction (e.g., direction B), the wearable electronic device 101 may be charged through the second power terminal 212 and the second ground terminal 222.

A user may suitably place the wearable electronic device 101 on the charging apparatus 102 in the first or second direction. The wearable electronic device 101 may be charged through the first set of terminals (e.g., the first power terminal 211 and the first ground terminal 221) or the second set of terminals (e.g., the second power terminal 212 and the second ground terminal 222) without regard to the arrangement direction of the wearable electronic device 101.

According to various embodiments, the first power terminal 211 and the second power terminal 212 may be arranged to be point-symmetric about a first point (e.g., I0) on the first axis I-I'. For example, the first point (e.g., I0) is a point where the straight line or virtual straight line L1 connecting the first power terminal 211 and the second power terminal 212 crosses the first axis I-I'. The first power terminal 211 and the second power terminal 212 may be arranged at the same distance from the first point (e.g., I0).

According to various embodiments, the first ground terminal 221 and the second ground terminal 222 are arranged to be point-symmetric about the first point (e.g., I0) on the first axis I-I'.

For example, the first point (e.g., I0) may be a midpoint between the first power terminal 211 and the second power terminal 212. As another example, the first point (e.g., I0) may be a midpoint between the first ground terminal 221 and the second ground terminal 222. As still another example, the first point (e.g., I0) is a point where the straight line or virtual straight line L2 connecting the first ground terminal 221 and the second ground terminal 222 crosses the first axis I-I'. The first ground terminal 221 and the second ground terminal 222 may be arranged at the same distance from the first point (e.g., I0).

According to various embodiments, an inner surface 210a of the charging surface 210 may include a plurality of holes 211a, 212a, 221a and 222a. A terminal formed of a conductive material (e.g., metal) may be exposed to an outside of the charging apparatus 102 through the holes 211a, 212a, 221a and 222a.

According to various embodiments, the plurality of holes 211a, 212a, 221a and 222a are arranged to be symmetrical about the first axis I-I' or point-symmetrical about the first point I0 on the first axis I-I'. For example, the first hole 211a through which the first power terminal 211 is exposed and the second hole 212a through which the second power terminal 212 is exposed may be arranged to be point-symmetric about the first point I0. The third hole 221a through which the first ground terminal 221 is exposed and the fourth hole 222a through which the second ground terminal 222 is exposed may be arranged to be point-symmetric about the first point I0.

Although the first power terminal 211, the first ground terminal 221, the second power terminal 212, and the second ground terminal 222 arranged based on the first axis I-I' have been described above with reference to FIG. 2, the embodiment is not limited thereto. For example, the first power terminal 211, the first ground terminal 221, the second power terminal 212, and the second ground terminal 222 may be arranged based on a second axis perpendicular to the first axis I-I'. In this case, the first set of terminals (e.g., the first power terminal 211 and the second ground terminal 222) may be arranged below the second axis and the second set of terminals (e.g., the second power terminal 212 and the first ground terminal 221) may be arranged above the second axis.

Figure 2C:
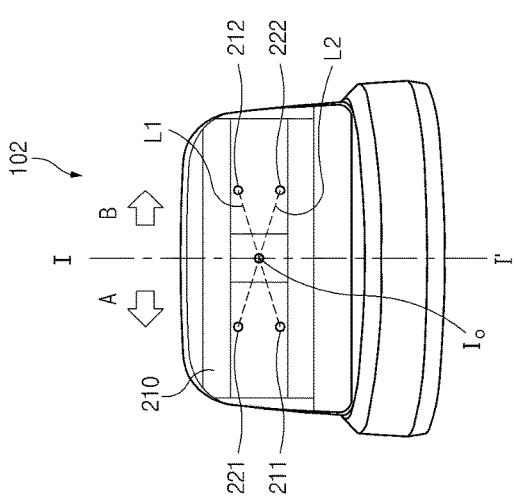
Figure 2D:
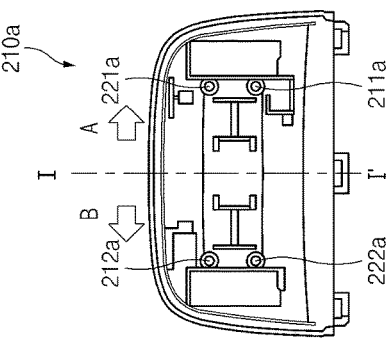
Figure 3A:
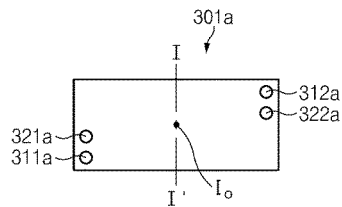
Figure 3B:
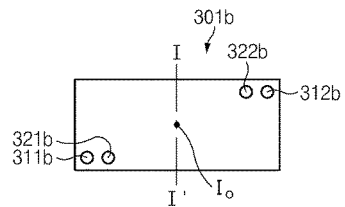
Figure 3C:
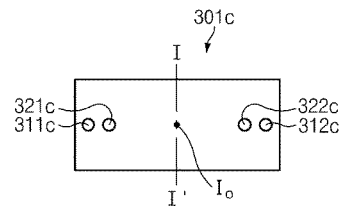
Figure 3D:
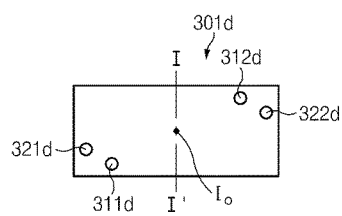
Figure 3E:
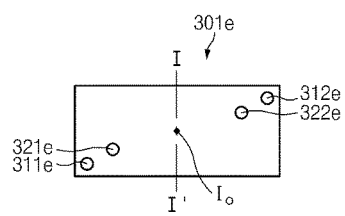
Figure 3F:
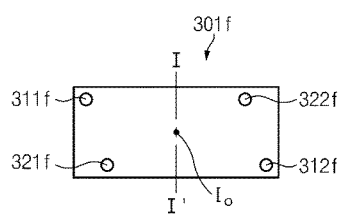
Figure 3G:
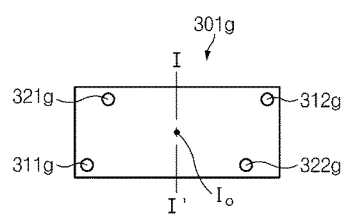
Figure 3H:
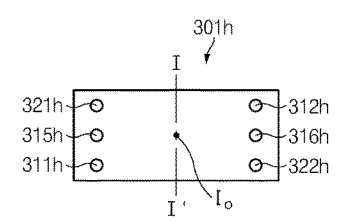
Figure 3I:
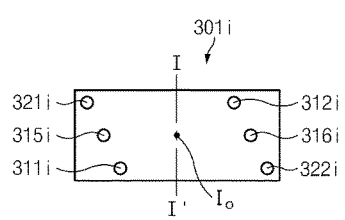
Figure 3K:
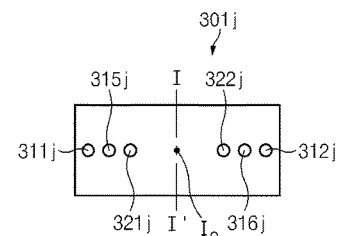
Figure 3K:
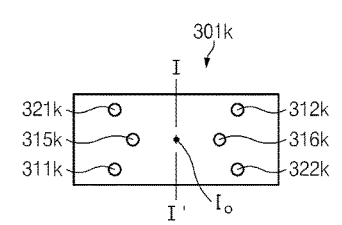
Figure 3L:
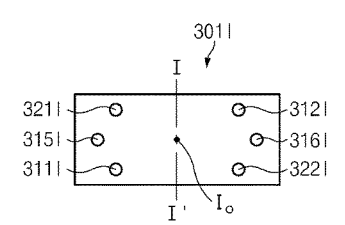

As shown in FIGS. 2C and 2D, the wearable electronic device 101 may include the power supply terminal 231 and the ground connection terminal 241 on a rear housing 230. The power supply terminal 231 may make contact with one of the first power terminal 211 or the second power terminal 212 of the charging apparatus 102 to receive power. In various embodiments, the power supply terminal 231 may be connected to a DC power source having a predetermined voltage value.

The ground connection terminal 241 may make contact with one of the first ground terminal 221 or the second ground terminal 222 of the charging apparatus 102 so that the ground connection terminal 241 is connected to the ground.

According to various embodiments, when the power supply terminal 231 and the ground connection terminal 241 are suitably placed in the first direction (direction A) of the charging apparatus 102, the wearable electronic device 101 may be charged through the first power terminal 211 and the first ground terminal 221. To the contrary, when the power supply terminal 231 and the ground connection terminal 241 are suitably placed in the second direction (direction B) of the charging apparatus 102, the wearable electronic device 101 may be charged through the second power terminal 212 and the second ground terminal 222.

According to various embodiments, the wearable electronic device 101 may further include a dummy terminal 251 on the rear housing 230. When the power supply terminal 231 and the ground connection terminal 241 make contact with the first power terminal 211 and the first ground terminal 221 of the charging apparatus 102, the dummy terminal 251 may make contact with the second power terminal 212 and the second ground terminal 222. To the contrary, when the power supply terminal 231 and the ground connection terminal 241 make contact with the second power terminal 212 and the second ground terminal 222 of the charging apparatus 102, the dummy terminal 251 may make contact with the first power terminal 211 and the first ground terminal 221.

According to various embodiments, the dummy terminal 251 may be included not for the purpose of electrical connection, but for the purpose of design balance with the power supply terminal 231 and the ground connection terminal 241 or of protecting the appearance. As one example, the dummy terminal 251 may have the same size or color as the first power supply terminal 231 and the ground connection terminal 241. As another example, a cushioning material such as rubber may be attached to the dummy terminal 251 to prevent scratching of the points where the dummy terminal 251 makes contact with the first and second power terminals 211 and 212 and the first and second ground terminals 221 and 222. As still another example, the dummy terminal 251 may be a concaved area of the rear housing 230 without attaching any additional materials thereto.

Although the dummy terminal 251 arranged in direction A' of the third axis II-II' and the power supply terminal 231 and the ground connection terminal 241 arranged in direction B' of the third axis II-II' are illustratively depicted in FIGS. 2C and 2D, the embodiment is not limited thereto. For example, the dummy terminal 251 may be arranged in the direction B' of the second axis II-II' and the power supply terminal 231 and the ground connection terminal 241 may be arranged in the direction A' of the second axis II-II'.

According to various embodiments, an inner surface 230a of the rear housing 230 may include a plurality of holes 231a and 241a. The power supply terminal 231 and the ground connection terminal 241 may be exposed to an outside of the wearable electronic device 101 through the holes 231a and 241a. The rear housing 230 may not include a separate hole for the dummy terminal 251. A cushioning material (e.g., rubber) constituting the dummy terminal 251 may be attached to the outside of the rear housing 230. In various embodiments, the inner surface 230a of the rear housing 230 may further include a separate hole 260a through which an HRM sensor or the like is exposed.

FIGS. 3A-3L are views illustrating various terminal arrangements of a charging apparatus according to various embodiments. FIGS. 3A-3L are illustrative and the embodiment is not limited thereto.

First power terminals 311a through 311l and first ground terminals 321a to 321l may be arranged in a first direction (e.g., direction A) with respect to a first axis or virtual first axis I-I', and second power terminals 312a to 312l and second ground terminals 322a to 322l may be arranged in a second direction (e.g., direction B) opposite to the first direction (e.g., direction A) with respect to the virtual first axis I-I'.

According to various embodiments, the first power terminals 311a to 311l and the second power terminals 312a to 312l may be arranged to be point-symmetric about the first point (e.g., I0) on the first axis I-I'. The first ground terminals 321a to 321l and the second ground terminals 322a to 322l may be arranged to be point-symmetric about the first point (e.g., I0) on the first axis I-I'.

In first through fifth arrangement views 301a to 301e, the first power terminals 311a to 311e and the first ground terminals 321a to 321e may be arranged adjacent to each other and the second power terminals 312a to 312e and the second ground terminals 322a to 322e may be arranged adjacent to each other. Each of the terminals may be arranged adjacent to an edge or an outer portion of the charging surface.

In sixth and seventh arrangement views 301f and 301g, the first power terminals 311f and 311g and the first ground terminals 321f and 321g may be arranged to maintain a predetermined distance from each other, and the second power terminals 312f and 312g and the second ground terminals 322f and 322g may be arranged to maintain a predetermined distance from each other. Each of the terminals may be arranged adjacent to an edge of the charging surface.

In eighth through twelfth arrangement views 301h through 301l, first additional terminals 315h through 315l may be included between the first power terminals 311h through 311l and the first ground terminals 321h through 321l, and second additional terminals 316h through 316l may be included between the second power terminals 312h through 312l and the second ground terminals 322h through 322l. The first additional terminals 315h through 315l and the second additional terminals 316h through 316l may be used for data communication between the wearable electronic device 101 and the charging apparatus 102. In one embodiment, the first additional terminals 315h through 315l and the second additional terminals 316h through 316l may transmit and receive signals related to the operation of a display (e.g., an LED) for displaying the charged state of the wearable electronic device 101. The power terminals, the additional terminals, and the ground terminals may be arranged in various forms such as a linear arrangement, a diagonal arrangement, a triangular arrangement, and the like.

In each view, the positions of the first power terminal and the first ground terminal may be interchanged with each other. In this case, the positions of the second power terminal and the second ground terminal may also be interchanged with each other.

Figure 4B:
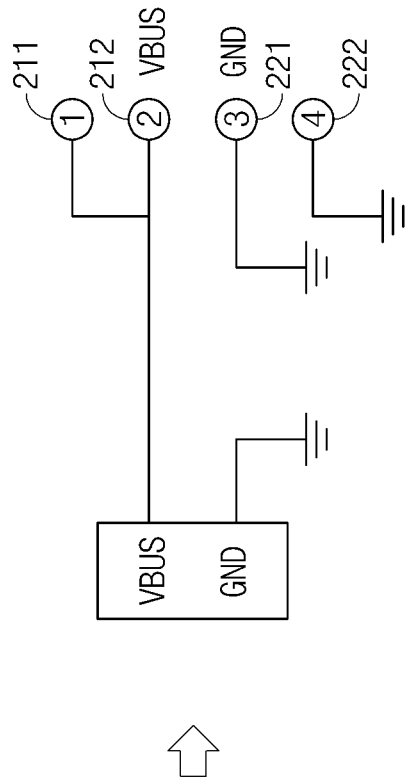
FIGS. 4A and 4B are views illustrating a power terminal and a ground terminal of a charging apparatus according to various embodiments.
Figure 4A:
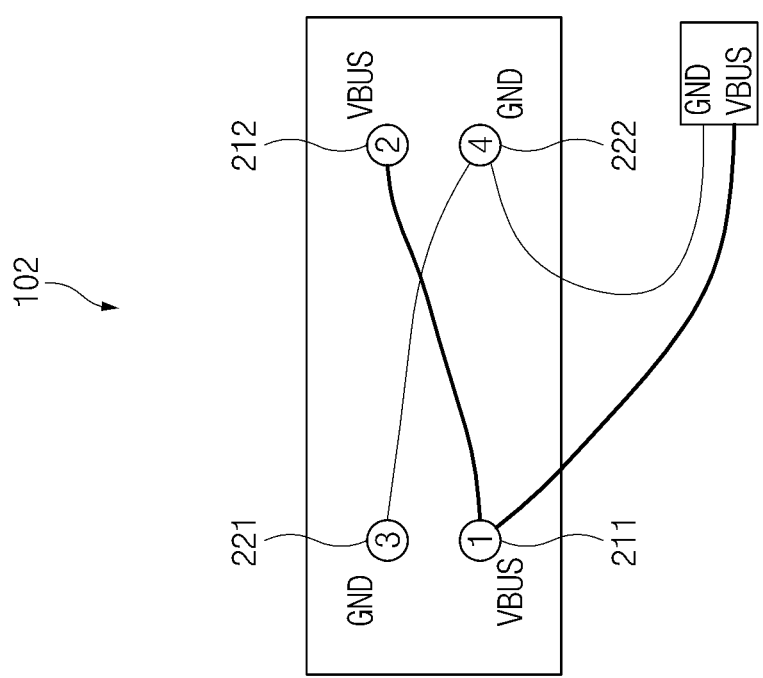

FIGS. 4A and 4B are views illustrating a power terminal and a ground terminal of a charging apparatus according to various embodiments.

A predetermined voltage value (e.g., 5 V) may be applied to the first and second power terminals 211 and 212. The first and second power terminals 211 and 212 may be connected to a power source (VBUS) applied from a printed circuit board (PCB) inside the charging apparatus 102. The first and second power terminals 211 and 212 may be directly connected to each other through a wire in the charging apparatus 102.

The first and second ground terminals 221 and 222 may be connected to the ground. The first and second ground terminals 221 and 222 may be connected to a ground area inside the charging apparatus 102.

A user may suitably place the wearable electronic device 101 on the charging apparatus 102 in the first direction to charge the wearable electronic device 101 through the first power terminal 211 and the first ground terminal 221, or may suitably place the wearable electronic device 101 on the charging apparatus 102 in the second direction to charge the wearable electronic device 101 through the second power and ground terminals 212 and 222.

According to various embodiments, when the power terminal and the ground terminal at one side are connected to the wearable electronic device 101, the power terminal and the ground terminal at another side may make contact with the dummy terminal of the wearable electronic device 101 so that power is blocked.

Figure 5A:
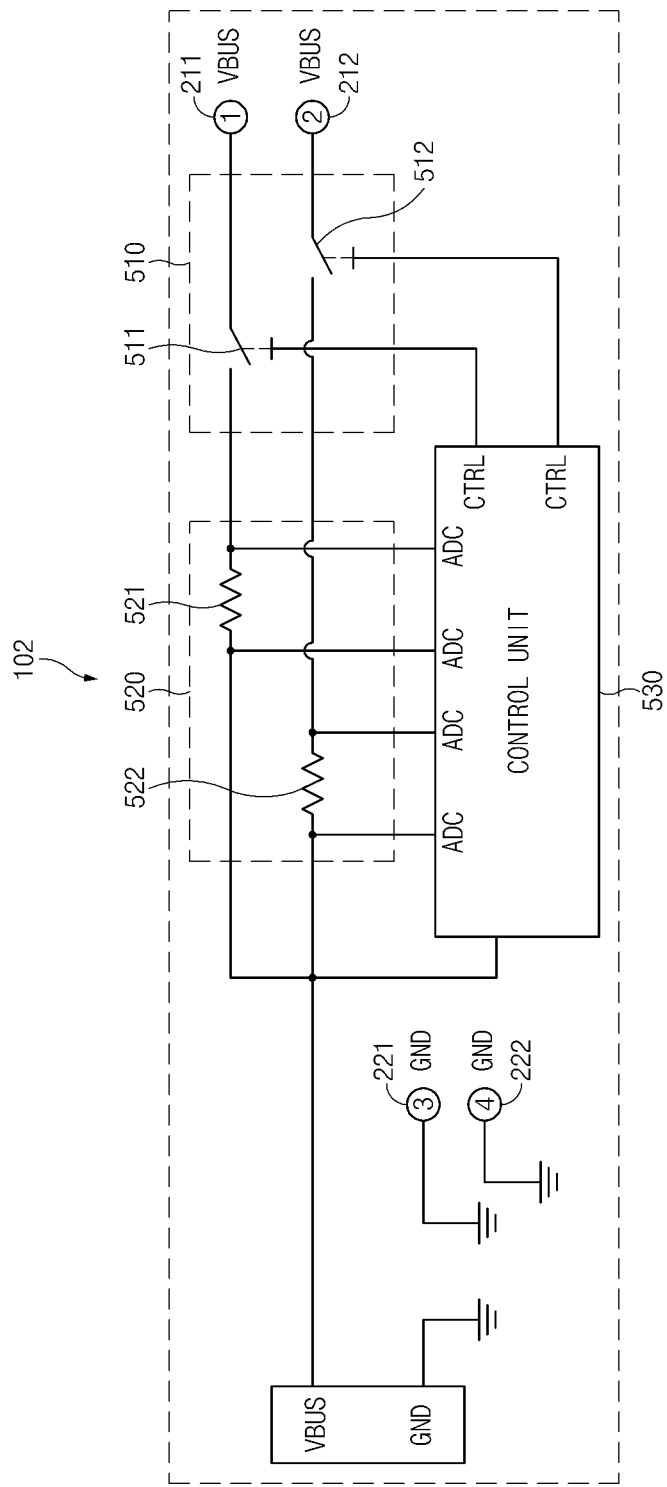
FIG. 5A is a circuit diagram illustrating a selective connection of a power terminal according to various embodiments.

FIG. 5A is a circuit diagram illustrating a selective connection of a power terminal according to various embodiments. FIG. 5A illustrates a scheme of detecting which terminal is connected to the wearable electronic device 101 using a current flowing across the resistor, but the embodiment is not limited thereto. For example, various devices capable of measuring current such as a coulomb counter and the like may be used.

Referring to FIG. 5A, the charging apparatus 102 may include the first power terminal 211, the second power terminal 212, the first ground terminal 221, the second ground terminal 222, a switching unit 510, a sensing unit 520, and a control unit 530.

The first and second power terminals 211 and 212 may be connected through the switching unit 510 and the sensing unit 520 to a power source (VBUS) applied from a PCB inside the charging apparatus 102.

The switching unit 510 may include a first switch 511 and a second switch 512. The first switch 511 may be arranged between the first power terminal 211 and a first resistor 521 of the sensing unit 520. The second switch 512 may be arranged between the second power terminal 212 and a second resistor 522 of the sensing unit 520. The first and second switches 511 and 512 may be opened or shorted under control of the control unit 530.

The sensing unit 520 may include the first and second resistors 521 and 522. The first resistor 521 may be connected in series between the first switch 511 and an internal power supply (VBUS) and the second resistor 522 may be connected in series between the second switch 512 and the internal power supply (VBUS).

The control unit 530 may sense a terminal to which the wearable electronic device 101 is connected based on current values which flow through the first and second resistors 521 and 522 of the sensing unit 520, respectively. The controller 530 may connect both the first switch 511 and the second switch 512 and compare the currents, which flow through the first resistor 521 and the second resistor 522, respectively, with each other.

The control unit 530 may allow the switch of a wire through which a current continuously flows to be continuously shorted, and allow the switch of a wire through which a current does not flow to be opened. As another example, the control unit 530 may allow the switch of a wire through which a relatively large current flows to be continuously shorted and allow the switch of a wire through which a relatively small current flows to be opened.

Figure 5B:
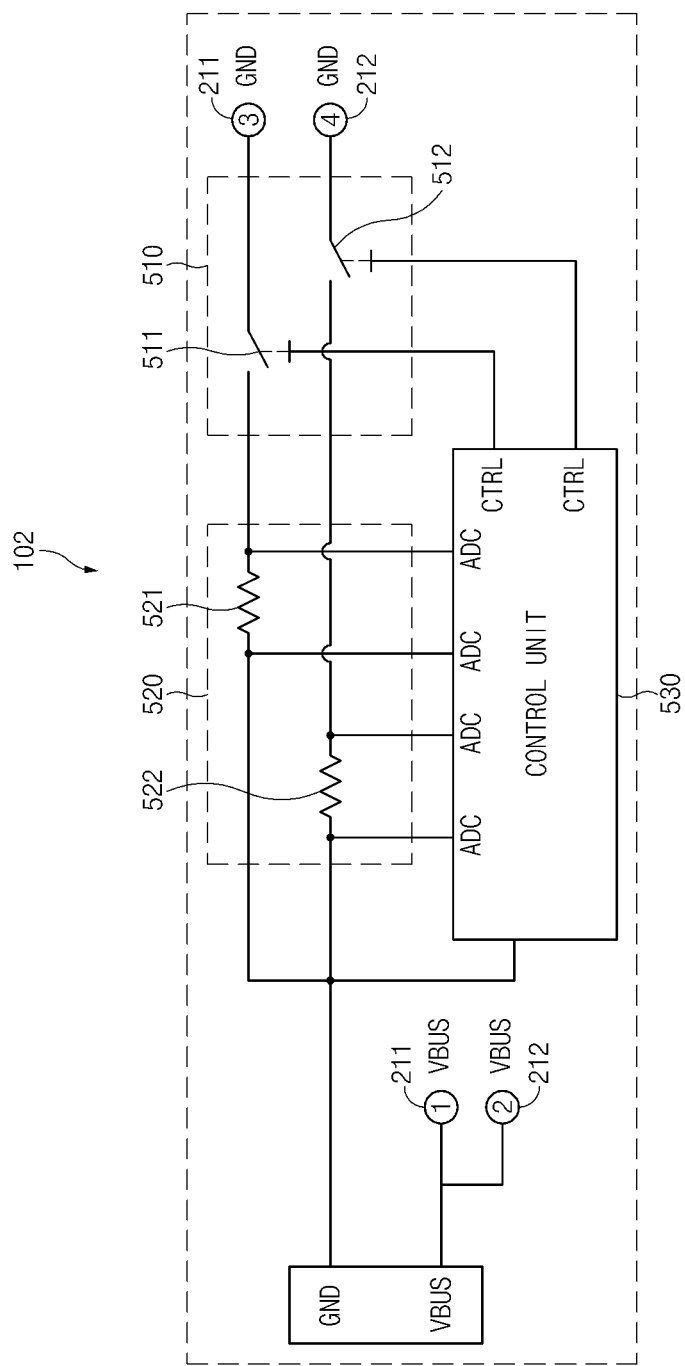
FIG. 5B is a circuit diagram illustrating a selective connection of a ground terminal according to various embodiments.

FIG. 5B is a circuit diagram illustrating a selective connection of a ground terminal according to various embodiments.

Referring to FIG. 5B, differently from FIG. 5A, the first and second ground terminals 221 and 222 may be connected to a ground area inside the charging apparatus 102 through the switching unit 510 and the sensing unit 520. Meanwhile, the first and second power terminals 211 and 212 may be directly connected to the power source (VBUS) applied from the PCB inside the charging apparatus 102.

The control unit 530 may sense which terminal is connected to the wearable electronic device 101 by using currents flowing across the resistor in the same or similar manner as in FIG. 5A. For example, the control unit 530 may compare the current values flowing through the first resistor 521 and the second resistor 522 of the sensing unit 520 with each other, such that the switch of a wire through which a relatively large current flows is continuously shorted and the switch of a wire through which a relatively small current flows is opened.

Figure 6A:
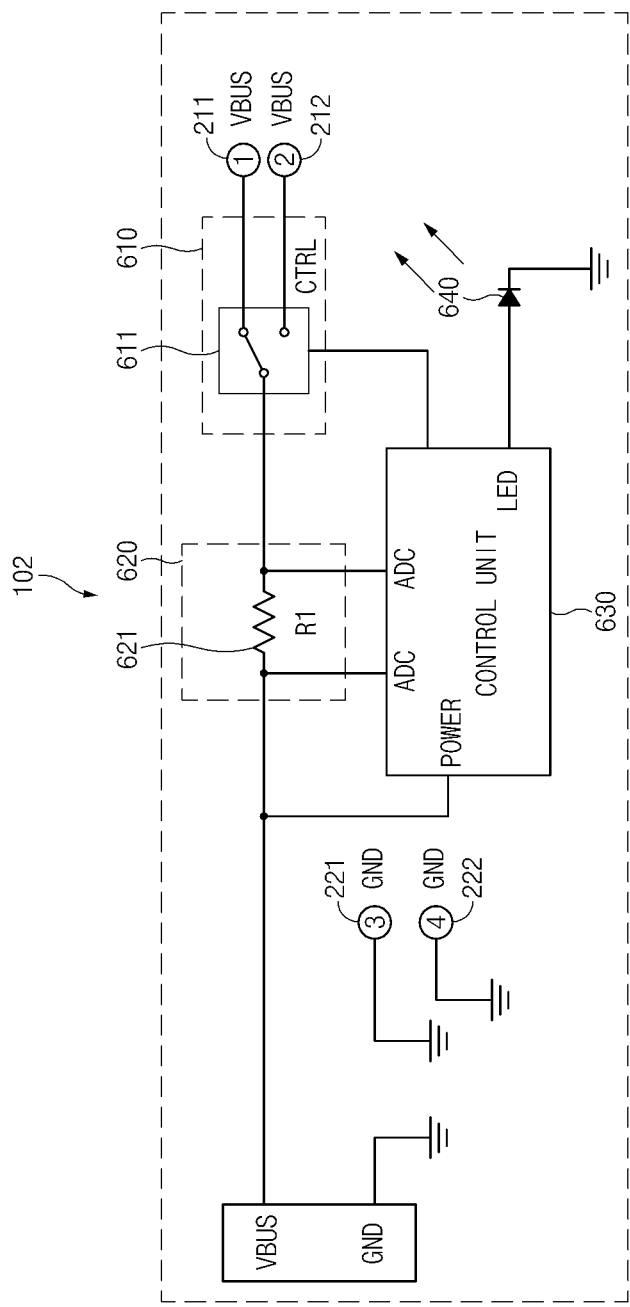
FIG. 6A is a circuit diagram illustrating a selective connection of a power terminal using an integrated switch and an integrated resistor according to various embodiments.

FIG. 6A is a circuit diagram illustrating a selective connection of a power terminal using an integrated switch and an integrated resistor according to various embodiments.

Referring to FIG. 6A, the charging apparatus 102 may include the first power terminal 211, the second power terminal 212, the first ground terminal 221, the second ground terminal 222, a switching unit 610, a sensing unit 620, and a control unit 630. In various embodiments, the charging apparatus 102 may further include a display unit 640 for a user notification.

The first and second power terminals 211 and 212 may be connected through the switching unit 610 and the sensing unit 620 to a power source (VBUS) applied from a PCB inside the charging apparatus 102.

The switching unit 610 may include one integrated switch (e.g., SPDT or DPDT) 611. The integrated switch 611 may connect one of the first and second power terminals 211 and 212 to the power source (VBUS) under control of the control unit 630.

The sensing unit 620 may include an integrated resistor 621. The integrated resistor 621 may be connected in series between the integrated switch 611 and the internal power source (VBUS).

The control unit 630 may sense the terminal connected to the wearable electronic device 101 based on a current value flowing through the integrated resistor 621 by the switching of the integrated switch 611. Additional information about the operation of the control unit 630 may be provided as shown in FIG. 6B.

Figure 6B:
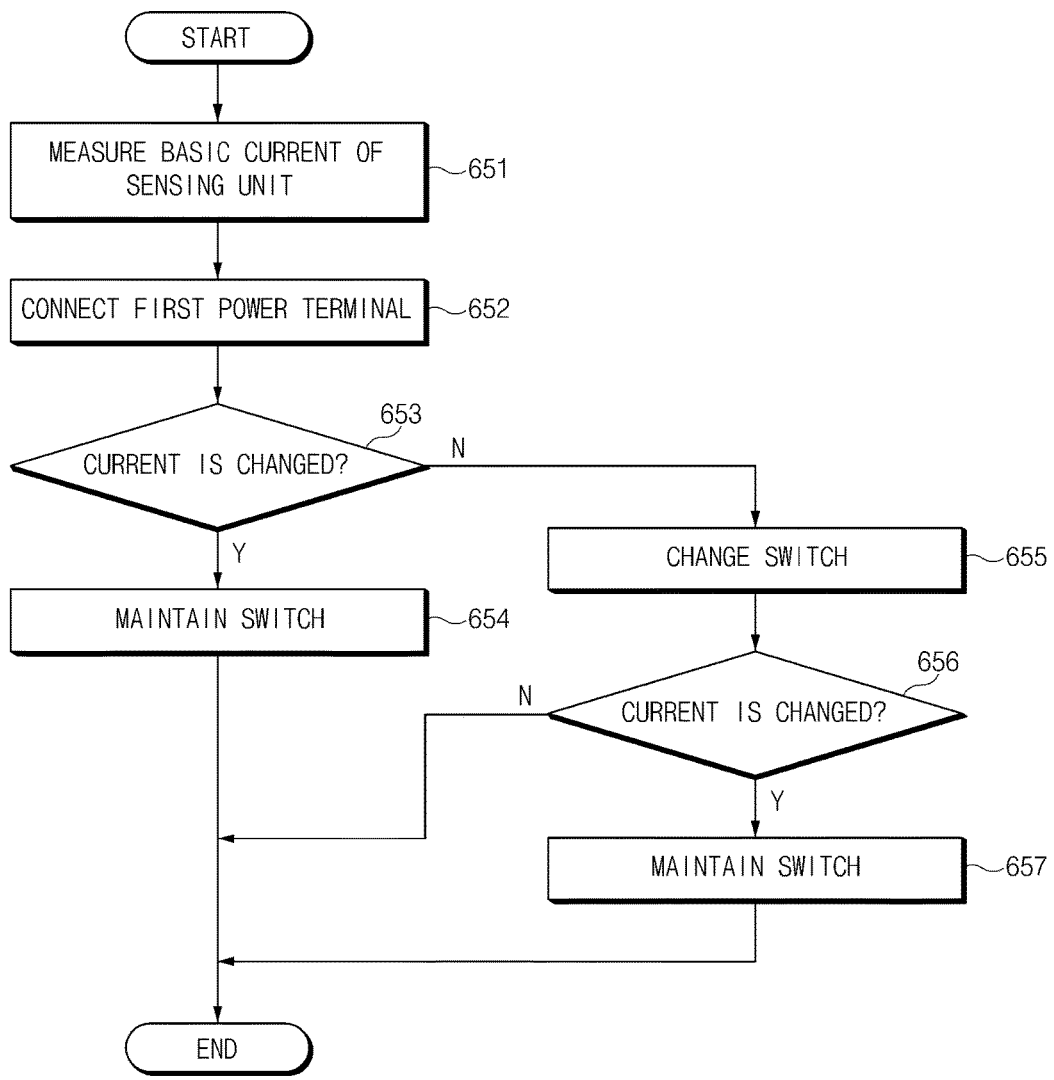
FIG. 6B is a flowchart illustrating an operation of a control unit according to various embodiments.

FIG. 6B is a flowchart illustrating an operation of a control unit according to various embodiments.

Referring to FIG. 6B, in operation 651, in the state that the integrated switch 611 is opened, the control unit 630 may measure a basic current flowing through the integrated resistor 621 included in the sensing unit 620.

In operation 652, the control unit 630 may control the integrated switch 611 to connect the first power terminal 211 to the power source (VBUS) and measure a first current flowing through the integrated resistor 621.

In operation 653, the control unit 630 may compare the first current value with the basic current value measured in operation 651 to confirm the current variation.

In operation 654, when the first current value is greater than the basic current value, the control unit 630 may continuously connect the integrated switch 611 to the first power terminal 211. In this case, the external wearable electronic device 101 may be charged through the first power terminal 211 and the first ground terminal 221.

In operation 655, when the first current value does not differ from the basic current value, the integrated switch 611 is controlled to connect the second power terminal 212 to the power source (VBUS) and measure a second current flowing through the integrated resistor 621.

In operation 656, the control unit 630 may compare the second current value with the basic current value measured in operation 651 to confirm the current variation.

In operation 657, when the second current value is greater than the basic current value, the control unit 630 may continuously connect the integrated switch 611 to the second power terminal 212. In this case, the external wearable electronic device 101 may be charged through the second power terminal 212 and the second ground terminal 222.

When the second current value does not differ from the basic current value, the control unit 630 may allow the integrated switch 611 to be opened.

FIGS. 7A and 7B are circuit diagrams illustrating a selective connection of a power terminal using magnetic sensing according to various embodiments.

In an arrangement view 701, the charging apparatus 102 may include one or more magnetic sensing units (e.g., a magnetoresistive element (MR), a hall sensor, etc.) 720a or 720b. In various embodiments, the first magnetic sensing unit 720a may be arranged in a first direction (e.g., direction A) with respect to a virtual first axis I-I', and the second magnetic sensing unit 720b may be arranged in a second direction (e.g., direction B) with respect to the virtual first axis I-I'. The first and second magnetic sensing units 720a and 720b may recognize the intensity (or direction) of a magnetic field included in the external wearable electronic device 101. The recognized information may be used to determine the placed direction of the wearable electronic device 101.

In a circuit diagram 702, the charging apparatus 102 may include the first power terminal 211, the second power terminal 212, the first ground terminal 221, the second ground terminal 222, a switching unit 710, a magnetic sensing unit 720, and a control unit 730. In various embodiments, the charging apparatus 102 may further include a display unit 740 for a user notification.

The first and second power terminals 211 and 212 may be connected through the switching unit 710 to a power source (VBUS) applied from a PCB inside the charging apparatus 102.

The switching unit 710 may include one integrated switch (e.g., SPDT or DPDT) 711. The integrated switch 711 may connect one of the first and second power terminals 211 and 212 to the power source (VBUS) under control of the control unit 730.

The magnetic sensing unit 720 may recognize the intensity (or direction) of the magnetic field included in the external wearable electronic device 101. In various embodiments, the magnetic sensing unit 720 may include the first magnetic sensing unit 720a and the second magnetic sensing unit 720b. The first magnetic sensing unit 720a may be arranged to be relatively closer to the first power terminal 211 and the first ground terminal 221 and the second magnetic sensing unit 720b may be arranged to be relatively closer to the second power terminal 212 and the second ground terminal 222.

The control unit 730 may sense the terminal connected to the wearable electronic device 101 based on the intensity of the magnetic field (generated from the magnetic body included in the wearable electronic device 101) sensed by the magnetic sensing unit 720.

For example, when the intensity of the magnetic field sensed by the first magnetic sensing unit 720a is greater than the intensity of the magnetic field sensed by the second magnetic sensing unit 720b, the control unit 730 may allow the integrated switch 711 to be connected to the first power terminal 211. In this case, the wearable electronic device 101 may be charged through the first power terminal 211 and the first ground terminal 221. To the contrary, when the intensity of the magnetic field sensed by the first magnetic sensing unit 720a is less than the intensity of the magnetic field sensed by the second magnetic sensing unit 720b, the control unit 730 may allow the integrated switch 711 to be connected to the second power terminal 212. In this case, the wearable electronic device 101 may be charged through the second power terminal 212 and the second ground terminal 222.

FIGS. 8A and 8B are views illustrating an internal configuration of a wearable electronic device according to various embodiments.

A wearable electronic device 801 may include various configurations mounted on a rear housing 805. The rear housing 805 may include a first terminal 811, a second terminal 812, and a magnetic member 820 mounted therein.

One of the first and second terminals 811 and 812 may be used as a power connection terminal and the other terminal may be used as a ground connection terminal. At least a portion of each of the first and second terminals 811 and 812 may be exposed to an outside through a hole formed in the rear housing 805.

At least one magnetic member 820 may be mounted on the rear housing 805. The magnetic member 820 may allow the wearable electronic device 801 to be suitably placed on a charging surface of the charging apparatus through a magnetic force. According to various embodiments, the magnetic member 820 may be sensed through at least one magnetic sensing unit (e.g., a magnetoresistive element (MR), a hall sensor, etc.) of the charging apparatus. The sensed magnetic information may be used for the wearable electronic device 801 to recognize a direction in which the wearable electronic device 801 is suitably placed.

According to various embodiments, the wearable electronic device 801 may include a dummy terminal 830 mounted outside the rear housing 805. The dummy terminals 830 may prevent a surface of the rear housing 805 from being damaged by a terminal of the charging apparatus.

FIGS. 8C and 8D are views illustrating a state that a wearable electronic device is suitably placed on a charging apparatus according to various embodiments.

When the wearable electronic device 801 is suitably placed on a charging apparatus 802, the first terminal 811 and the second terminal 812 may make contact with the power terminal or the ground terminal 851 to 854 formed on the charging surface of the charging apparatus 802, so that the first terminal 811 and the second terminal 812 are electrically connected to the power terminal or the ground terminal. In various embodiments, first and second power terminals 851 and 852 and first and second ground terminals 853 and 854 may be formed on the charging surface of the charging apparatus 802.

For example, when the wearable electronic device 801 is suitably placed (placed in the form shown in FIGS. 8C and 8D) on the charging device in the first direction, the first power terminal 851 and the first ground terminal 853 may be in contact with the first terminal 811 and the second terminal 812 so that the wearable electronic device 801 is charged.

To the contrary, when the wearable electronic device 801 is suitably placed (placed in an opposite form to that shown in FIGS. 8C and 8D) on the charging apparatus in the second direction (opposite to the first direction), the second power terminal 852 and the second ground terminal 854 may be in contact with the first and second terminals 811 and 812 so that the wearable electronic device 801 is charged.

According to various embodiments, the wearable electronic device 801 may not be equipped with a separate dummy terminal outside the rear housing 805. In this case, the rear housing 805, which makes contact with the first and second power terminals 851 and 852 and the first and second ground terminals 853 and 854, may be concaved in an inner direction to reduce the surface damage due to the contact.

FIGS. 9A-9D are views illustrating states that a wearable electronic device having a circular display is suitably placed on a charging apparatus according to various embodiments.

A wearable electronic device 901 may include a circular display 905, side housings 910A and 910B, and a rear housing 915.

The wearable electronic device 901 may be charged when the rear housing 915 is suitably placed to make contact with the charging surface of a charging apparatus 902. The rear housing 915 of the wearable electronic device 901 may be configured to expose a power connection terminal and a ground connection terminal.

First and second power terminals 951 and 952 and first and second ground terminals 953 and 954 may be formed on the charging surface of the charging apparatus 902. For example, when the wearable electronic device 901 is suitably placed on the charging apparatus in a first direction (e.g., in such a manner that a button part 913 is seen from an outside), the wearable electronic device 901 may be charged through the first power terminal 951 and the first ground terminal 953.

To the contrary, when the wearable electronic device 901 is seated in the charging device in the second direction (the direction opposite to the first direction) (for example, the button part 913 is suitably placed in such a manner that the button part 913 is seen from an outside), the wearable electronic device 901 may be charged via the second power terminal 952 and the second ground terminal 954.

Figure 9D:
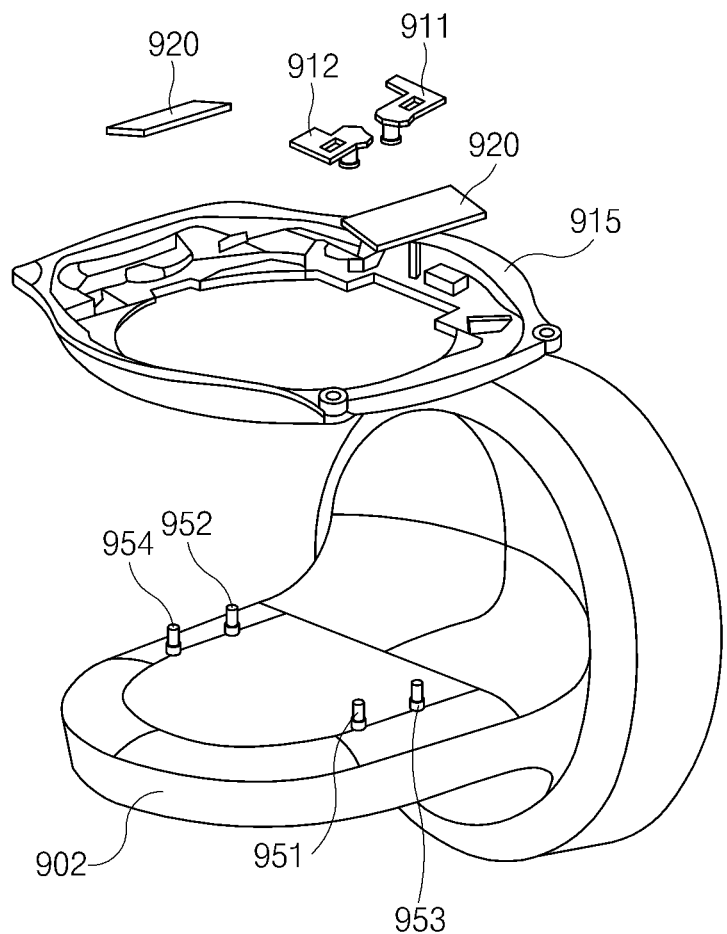
FIG. 9D is a view illustrating a state that a wearable electronic device having a circular display is suitably placed on a charging apparatus according to various embodiments.

FIG. 9D is a view illustrating a state that a wearable electronic device having a circular display is suitably placed on a charging apparatus according to various embodiments.

First and second terminals 911 and 912 and a magnetic member 920 may be installed in the rear housing 915.

One of the first and second terminals 911 and 912 may be used as a power connection terminal and the other terminal may be used as a ground connection terminal. At least a portion of each of the first and second terminals 911 and 912 may be exposed to an outside through a hole formed in the rear housing 915.

At least one magnetic member 920 may be mounted on the rear housing 915. The magnetic member 920 may allow the wearable electronic device 901 to be suitably placed on a charging surface of the charging apparatus through a magnetic force. According to various embodiments, the magnetic field may be sensed through a magnetic sensing unit (e.g., a magnetoresistive element (MR), a hall sensor, etc.) of the charging apparatus. The sensed magnetic information may be used for the charging apparatus to recognize a direction in which the wearable electronic device 901 is suitably placed.

According to various embodiments, an apparatus for charging a wearable electronic device, the apparatus includes a first power terminal and a second power terminal to which predetermined voltage values are applied, respectively; and a first ground terminal and a second ground terminal, wherein the first power terminal and the first ground terminal are arranged in a first direction with respect to a virtual first axis, wherein the second power terminal and the second ground terminal are arranged in a second direction opposite to the first direction with respect to the first axis, wherein the wearable electronic device is charged through the first power terminal and the first ground terminal when the wearable electronic device is placed on the apparatus in the first direction, and wherein the wearable electronic device is charged through the second power terminal and the second ground terminal when the wearable electronic device is placed on the apparatus in the second direction.

According to various embodiments, the first power terminal and the second power terminal are arranged to be point symmetric about a first point on the first axis, and the first ground terminal and the second ground terminal are arranged to be point symmetric about the first point.

According to various embodiments, the first point is a midpoint between the first power terminal and the second power terminal or between the first ground terminal and the second ground terminal.

According to various embodiments, the first point is one of a point at which a first straight line or virtual first straight line connecting the first power terminal and the second power terminal meets the first axis, a point at which a second straight line or virtual second straight line connecting the first ground terminal and the second ground terminal meets the first axis, and a point at which the first straight line, the second straight line, and the first axis meet each other.

According to various embodiments, when the wearable electronic device is placed on the apparatus in the first direction, the first power terminal makes contact with a power supply terminal of the wearable electronic device, and the first ground terminal makes contact with a ground connection terminal of the wearable electronic device.

According to various embodiments, the second power terminal and the second ground terminal make contact with an insulating dummy pad mounted on an external housing of the wearable electronic device.

According to various embodiments, when the wearable electronic device is placed on the apparatus in the second direction, the second power terminal makes contact with a power supply terminal of the wearable electronic device, and the second ground terminal makes contact with a ground connection terminal of the wearable electronic device.

According to various embodiments, the first power terminal and the first ground terminal make contact with an insulating dummy pad mounted on an external housing of the wearable electronic device.

According to various embodiments, the first power terminal and the second power terminal are simultaneously or respectively connected to a power source unit inside the apparatus, and the first ground terminal and the second ground terminal are simultaneously or respectively connected to a ground area inside of the apparatus.

According to various embodiments, the apparatus further includes a first resistor and a second resistor, a first switch and a second switch and a control unit configured to control the first switch and the second switch, wherein the control unit allows one of the first switch and the second switch to be shorted and the other switch to be opened, based on currents which flow through the first resistor and the second resistor, respectively.

According to various embodiments, the first power terminal is connected to a power source unit inside the apparatus through the first resistor and the first switch, and the second power terminal is connected to the power source unit inside the apparatus through the second resistor and the second switch.

According to various embodiments, the first ground terminal is connected to a ground area inside the apparatus through the first resistor and the first switch, and the second ground terminal is connected to the ground area inside the apparatus through the second resistor and the second switch.

According to various embodiments, the apparatus further includes a first resistor, a first switch, and a control unit configured to control the first switch, wherein one of the first power terminal and the second power terminal is connected to a power source unit inside the apparatus through the first resistor and the first switch, and wherein the control unit allows one of the first power terminal and the second power terminal to be connected to the power source unit, based on a current flowing through the first resistor.

According to various embodiments, the control unit measures a basic current flowing through the first resistor in a state where the first switch is opened, and maintains a state of the first switch when a current larger than the basic current flows in a state where one of the first power terminal and the second power terminal is connected.

According to various embodiments, the apparatus further includes a first switch, a magnetic sensing unit configured to recognize a magnetic field generated from the wearable electronic device, and a control unit configured to control the first switch and the magnetic sensing unit, wherein one of the first power terminal and the second power terminal is connected to a power source unit inside the apparatus through the first switch, and wherein the control unit allows one of the first terminal and the second terminal to be connected to the power source unit, based on information about the magnetic field recognized by the magnetic sensing unit.

According to various embodiments, the magnetic sensing unit includes a magnetoresistive element or a hall sensor.

According to various embodiments, the apparatus further includes a coupling structure configured to make contact with the wearable electronic device.

According to various embodiments, the coupling structure is a hook structure for mechanical coupling or a magnetic member using magnetic force.

According to various embodiments, the first power terminal, the second power terminal, the first ground terminal, and the second ground terminal are arranged on a same surface.

According to various embodiments, each of the first power terminal, the second power terminal, the first ground terminal, and the second ground terminal are implemented with a pogo pin.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present invention, the apparatus for charging a wearable electronic device may be coupled with the wearable electronic device in various directions, thereby allowing a user to easily charge the wearable electronic device.

In addition, according to various embodiments of the present invention, the apparatus for charging a wearable electronic device may cut off the power applied to the charging terminal which is not used for charging the wearable electronic device among charging terminals, thereby improving the power efficiency of the apparatus for charging the wearable electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for charging a wearable electronic device, the apparatus comprising:
    a first power terminal and a second power terminal to which predetermined voltage values are applied, respectively; and
    a first ground terminal and a second ground terminal,
    wherein the first power terminal and the first ground terminal are arranged in a first direction with respect to a first axis,
    wherein the second power terminal and the second ground terminal are arranged in a second direction opposite to the first direction with respect to the first axis,
    wherein the wearable electronic device is configured to be charged through the first power terminal and the first ground terminal when the wearable electronic device is placed on the apparatus in the first direction, and
    wherein the wearable electronic device is configured to be charged through the second power terminal and the second ground terminal when the wearable electronic device is placed on the apparatus in the second direction.

2. The apparatus of claim 1, wherein the first power terminal and the second power terminal are arranged to be point symmetric about a first point on the first axis, and
    wherein the first ground terminal and the second ground terminal are arranged to be point symmetric about the first point.

3. The apparatus of claim 2, wherein the first point is a midpoint between the first power terminal and the second power terminal or between the first ground terminal and the second ground terminal.

4. The apparatus of claim 2, wherein the first point is one of a point at which a first straight line connecting the first power terminal and the second power terminal meets the first axis, a point at which a second straight line connecting the first ground terminal and the second ground terminal meets the first axis, and a point at which the first straight line, the second straight line, and the first axis meet each other.

5. The apparatus of claim 1, wherein, when the wearable electronic device is placed on the apparatus in the first direction, the first power terminal is configured to make contact with a power supply terminal of the wearable electronic device, and the first ground terminal is configured to make contact with a ground connection terminal of the wearable electronic device.

6. The apparatus of claim 5, wherein the second power terminal and the second ground terminal are configured to make contact with an insulating dummy pad mounted on an external housing of the wearable electronic device.

7. The apparatus of claim 1, wherein, when the wearable electronic device is placed on the apparatus in the second direction, the second power terminal is configured to make contact with a power supply terminal of the wearable electronic device, and the second ground terminal is configured to make contact with a ground connection terminal of the wearable electronic device.

8. The apparatus of claim 7, wherein the first power terminal and the first ground terminal are configured to make contact with an insulating dummy pad mounted on an external housing of the wearable electronic device.

9. The apparatus of claim 1, wherein the first power terminal and the second power terminal are simultaneously or respectively connected to a power source unit inside the apparatus, and
wherein the first ground terminal and the second ground terminal are simultaneously or respectively connected to a ground area inside of the apparatus.

10. The apparatus of claim 1, further comprising:
a first resistor and a second resistor;
a first switch and a second switch; and
a control unit configured to control the first switch and the second switch,
wherein the control unit allows one of the first switch and the second switch to be shorted and the other of the first switch and the second switch to be opened, based on currents that flow through the first resistor and the second resistor, respectively.

11. The apparatus of claim 10, wherein the first power terminal is connected to a power source unit inside the apparatus through the first resistor and the first switch, and
wherein the second power terminal is connected to the power source unit inside the apparatus through the second resistor and the second switch.

12. The apparatus of claim 10, wherein the first ground terminal is connected to a ground area inside the apparatus through the first resistor and the first switch, and
wherein the second ground terminal is connected to the ground area inside the apparatus through the second resistor and the second switch.

13. The apparatus of claim 1, further comprising:
a first resistor;
a first switch; and
a control unit configured to control the first switch,
wherein one of the first power terminal and the second power terminal is connected to a power source unit inside the apparatus through the first resistor and the first switch, and
wherein the control unit allows one of the first power terminal and the second power terminal to be connected to the power source unit, based on a current flowing through the first resistor.

14. The apparatus of claim 13, wherein the control unit measures a basic current flowing through the first resistor in a state where the first switch is opened, and maintains a state of the first switch when a current larger than the basic current flows in a state where one of the first power terminal and the second power terminal is connected.

15. The apparatus of claim 1, further comprising:
a first switch;
a magnetic sensing unit configured to recognize a magnetic field generated from the wearable electronic device; and
a control unit configured to control the first switch and the magnetic sensing unit,
wherein one of the first power terminal and the second power terminal is connected to a power source unit inside the apparatus through the first switch, and
wherein the control unit allows one of the first terminal and the second terminal to be connected to the power source unit, based on information about the magnetic field recognized by the magnetic sensing unit.

16. The apparatus of claim 15, wherein the magnetic sensing unit includes at least one of a magnetoresistive element or a hall sensor.

17. The apparatus of claim 1, further comprising:
a coupling structure configured to make contact with the wearable electronic device.

18. The apparatus of claim 17, wherein the coupling structure is a hook structure for mechanical coupling or a magnetic member configured to use magnetic force.

19. The apparatus of claim 1, wherein the first power terminal, the second power terminal, the first ground terminal, and the second ground terminal are arranged on a same surface.

20. The apparatus of claim 1, wherein each of the first power terminal, the second power terminal, the first ground terminal, and the second ground terminal are implemented with a pogo pin.

* * * * *